United States Patent [15] 3,678,753
Eggleston et al. [45] July 25, 1972

[54] PRESSURE TRANSDUCER

[72] Inventors: Gerard Eggleston, Danvers; Bosworth, George, Holbrook, both of Mass.

[73] Assignee: Microdot, Inc., Westwood, Mass.

[22] Filed: July 28, 1970

[21] Appl. No.: 58,817

[52] U.S. Cl. ................................. 73/393, 73/398 AR, 338/4
[51] Int. Cl. ........................................................ G01l 9/04
[58] Field of Search .................. 73/398 R, 298 AR, 406, 393; 338/4, 41, 42

[56] References Cited

UNITED STATES PATENTS 3,349,623 10/1967 Pastan .............................. 73/398 AR Primary Examiner—Donald O. Woodiel
Attorney—Wolf, Greenfield & Sacks

[57] ABSTRACT

A pressure transducer with a diaphragm coupler at one end and a sensing device at the other end connected by a capillary tube. The sensing device includes a cap having a deformable surface to which a strain gauge arrangement is attached, and defining, with an upper portion of the transducer, a thin sensor compartment whereby a liquid filling the capillary tube and sensor compartment will transmit a pressure exerted against the diaphragm coupler to the deformable surface of the cap.

18 Claims, 3 Drawing Figures

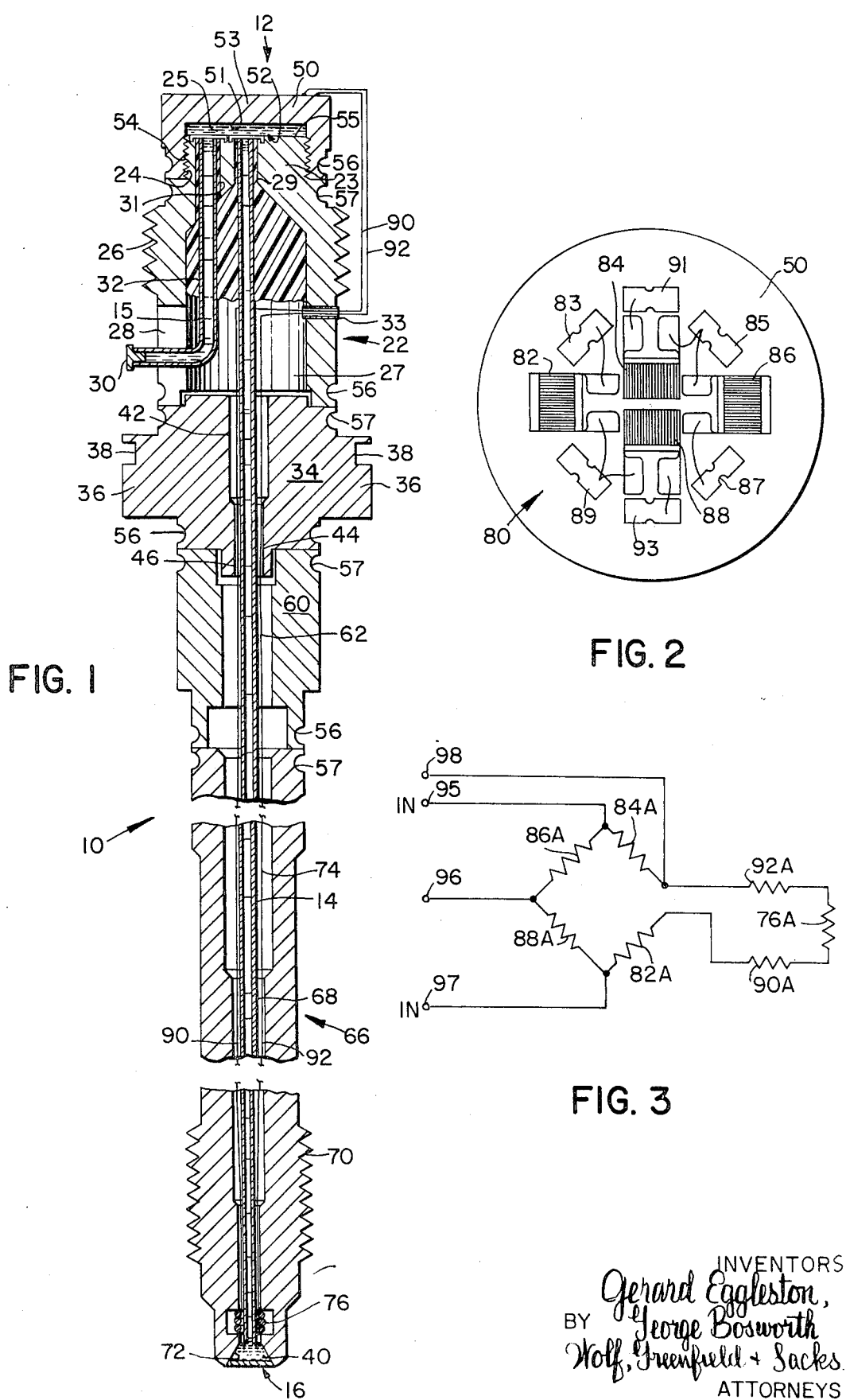

PRESSURE TRANSDUCER

BACKGROUND OF THE INVENTION

The present invention relates to an improved pressure transducer and is more particularly concerned with an improved fluid filled pressure transducer such as disclosed in U.S. Pat. No. 3,349,623 to Pastan, issued Oct. 31, 1967.

As discussed in the Pastan patent, fluid filled pressure transducers are designed to be used in those systems in which it is undesirable for the medium whose pressure is being measured to enter into the instrument. In such cases, the instrument itself is filled with a fluid which is coupled by means of a diaphragm or some other device to the medium whose pressure is to be measured, and the fluid which fills the instrument directly transmits the pressure of the medium to the sensing device. The fluid fill must necessarily have a boiling point higher than the temperature of the medium to which the instrument is exposed, as the introduction of vapor pressure into the gauge will produce extraneous readings at the sensing device which are not representative of the pressure being measured, Similarly, the freezing point of the fluid should be lower than the minimum operating temperature.

One of the primary objects of the Pastan invention was to prove a fluid filled pressure transducer providing full scale deflection of the sensing device with a minimum volumetric displacement. The minimum volumetric displacement of the fluid filling the instrument minimized the effect upon the fluid medium whose pressure was being sensed. The minimum volumetric displacement resulted in a minimum coupler deflection, and when the coupler was a diaphragm, minimum deflection maintained the diaphragm deflection in the linear range. Diaphragm deflection did not exceed 3 percent of the diaphragm diameter to maintain linearity.

This prior art device did, however, have some disadvantages associated with it. For example, it did not operate effectively at lower pressures. Also, the device was relatively costly to manufacture.

Accordingly, one important object of the present invention is to provide a fluid filled pressure transducer having a wide pressure operating range.

It is another object of the present invention to provide a pressure transducer which is capable of operating at relatively low pressures. According to one aspect of the invention, a strain gauge bridge is used having four active arms and thus provides the same output for lower pressures as many prior art devices wherein only two bridge arms are active.

A further object of the present invention is to provide a pressure transducer that may be designed to have a higher overload capacity than some known devices. For some applications it may be desirable to provide a higher overload capacity instead of providing the capability of measuring low pressures. As previously mentioned, with the device of this invention the four active arms of the bridge provide the same output for lower stress levels. Thus the sensing device may be made heavier so that the same output is provided for the same stress level. The heavier sensing device extends the upper operating range of the device thereby providing a higher overload capability.

Still a further object of the present invention is to provide a fluid filled pressure transducer that may be fabricated inexpensively.

Still a further object of the invention is to provide a transducer which includes a pressure sensing device that may be easily removed from the rest of the instrument, thereby providing the capability of using the device over different pressure ranges.

SUMMARY OF THE INVENTION

To accomplish these and other objects, the pressure transducer of this invention includes an elongated frame and a capillary tube extending through the frame and terminating at one end adjacent one end of the frame. A coupler closes that end of the frame and defines with the frame a chamber that is in communication with the capillary tube. The other end of the capillary tube communicates with a sensing device which has a very small deflection throughout its full operative range. The sensing device comprises a deformable cap member having a recess therein defining with a portion of the frame a thin sensor compartment in communication with the other end of the capillary tube. A liquid fills the thin sensor compartment, chamber and capillary tube so as to transmit directly the pressure applied against the coupler to the sensing device to render a pressure measurement.

In accordance with one embodiment of this invention, a temperature sensing winding is disposed adjacent to the coupler, which forms part of a separate temperature compensating system to balance the effect upon the sensing device of expansion of the liquid in the instrument.

BRIEF DESCRIPTION OF THE DRAWINGS

FIG. 1 is a cross-sectional view of one form of fluid filled pressure transducer constructed in accordance with this invention;

FIG. 2 is a plan view of the sensing device of FIG. 1 showing the strain gauge arrangement; and FIG. 3 is a schematic diagram illustrating the strain gauge circuit employed in the transducer shown in FIG. 1.

DETAILED DESCRIPTION

The embodiment of this invention shown in FIG. 1 includes a main frame 10, a sensing device 12 provided at the top end of the frame, a capillary tube 14 which extends through the frame, and a diaphragm coupler 16 secured to and closing the bottom end of the frame.

The frame 10 includes an upper generally cylindrical portion 22, an intermediate portion 34, a hexagonal portion 60, and stem portion 66. When the transducer is assembled these various portions are suitably attached to each other such as by welding to provide a tight, sealed device.

Upper portion 22 includes a smaller diameter cylindrical top 23 which is threaded at 24 to mate with the threads 54 of cap 50. The upper surface 55 of cylindrical top 23 is machined as is the surface 51 of the recess 52 in cap 50, to define a thin sensor compartment 25 which may be filled with a liquid 40 such as mercury. Upper portion 22 also has a cylindrical chamber 27 partially filled with an epoxy 32 to hold capillary tube 14 and filler tube 15 in place. Filler tube 15 is curved at its bottom section and extends through opening 28 in the side of portion 22. The top portions of capillary tube 14 and filler tube 15 extend through passages 29 and 31 respectively in portion 22 and terminate at the upper surface of cylindrical top 23. The other end of capillary tube 14 terminates adjacent the coupler 16 whereas the opposite end of filler tube 15 terminated just outside passage 28 and may be provided with a plug 30. The liquid that fills the pressure transducer may be forced under pressure through filler tube 15, and plug 30 which is preferably threaded into tube 15 retains the liquid in the device.

Annular welding recess 56 is provided at the bottom end of portion 22 and a similar recess 57 is provided at the top end of portion 34. An annular weld may be formed between these annular recesses to attach frame portions 22 and 34 together. Similarly, other annular recesses are shown in FIG. 1 for securing the other portions of the device together.

Intermediate portion 34 includes a passage 42 for accommodating capillary tube 14 and also includes an annular flange 36 having a circumferentially extending slot 38. Slot 38 is provided so that a housing member (not shown) may be attached to the frame and cover the sensing device 12 and protect the top portion of the pressure transducer. The bottom end of intermediate portion 34 includes a downwardly extending flange 46 which meets with the hexagonal portion disposed below portion 34. Portions 34 and 60 are conventionally welded at the recesses 56 and 57 provided near their adjacent ends.

Hexagonal portion 60 is provided to facilitate the use of a wrench to mount the transducer in place. It will be noted that mounting threads 70 are shown near the bottom of stem 66 which are screwed into a socket in the machine on which the transducer is used. The capillary tube 14 passes through passage 62 in hexagonal portion 60 and further extends through a passage 68 in the stem portion 66.

The diaphragm coupler 16 is located at the bottom end of stem portion 22, is relatively flexible, and has a low spring rate. It is subject to minimum stresses as it is completely supported on the inside by the fluid 40 which fills chambers 72 behind it. Unlike diaphragms which are connected to and work against push-rods, strain tubes or other similar devices in unfilled instruments, which diaphragms operate at high stress and are subject to diaphragm rupture, the diaphragm of this invention operates at very low stress levels because it is supported on the back by substantially the same pressure which is exerted against the outside or exposed face and is thus subjected to only minimum deflections. The fluid 40 which fills the chamber 72 also fills the capillary tube 14, and compartment 25 which forms part of sensing device 12.

When the transducer is used in a temperature range having a maximum of about 750° F, mercury is the ideal fluid to fill the device. Mercury has a low compressibility and a boiling point in excess of 700° F, so that within that operative range no vapor pressures will be generated to cause secondary expansion of the chamber 25 to distort the wall 53 of cap 50.

In a preferred form of the invention, the capillary tube 14 has an inner diameter of approximately 0.010 inch, and the thin compartment 25 defined by cap 50 and cylindrical top 23, is 0.005 inch. The chamber 72 is approximately 0.010 inch deep measured from the inner surface of the diaphragm 16, and the thickness of wall 53 is between 0.015 and 0.030 inch.

The sensing device of the present invention includes the cap 50 having recess 52 defining wall 53. Compartment 25 can be very accurately formed in the embodiment of FIG. 1 with the use of conventional machining techniques. By accurately machining recess 52 to the correct depth and also machining the upper surface of cylindrical top 23 of portion 22, a very thin compartment 25 is achieved and deformable wall 53 is defined within close tolerances. (In FIG. 1 wall 53 is exaggerated in size, as in compartment 25.) This degree of accuracy using relatively simple machining techniques was not readily obtainable in prior art devices.

In FIG. 1 it will be noted that temperature compensation means is also provided. This feature is particularly desirable when the transducer is designed to operate over a wide temperature range and the diaphragm coupler is unable to wholly dissipate the effects of liquid expansion in the device. This means includes a wire 74 having wire lengths 90 and 92 which runs vertically along capillary tube 14 from the bottom end of stem portion 66 to vertical passage 27 in upper portion 22. Small hole 33 is provided in upper portion 22 to allow wire 74 to pass external of the device and connect to the strain gauge arrangement 80 discussed in more detail hereafter with reference to FIG. 2. At the diaphragm end, wire 74 is coiled at 76 to form a loop. The coil provides a substantial length of the wire at that point. Coil 76 is adjacent to chamber 72 where the volume of mercury which fills the device is great and is subjected to the highest temperatures. Thus, the application of heat to the diaphragm end of stem portion 66 causes the greatest increase in resistance of wire 74 at 76. When the wire 74 including loop 76 is connected in the bridge circuit of FIG. 3 in series with an arm of the bridge whose resistance decreases with increases in pressure, then the increase in resistance of the loop 76 and the decrease in resistance of the bridge resistor, due to attendant heat caused by expansion of the liquid, tend to balance or compensate for one another.

In another embodiment of a temperature compensation means according to the invention, the loop 76 is replaced by a short length of higher resistance wire, which is characterized by a larger resistance change for a given temperature change than the rest of wire 76. This short length of higher resistance wire may be soldered directly between the wire lengths 90 and 92 and provides the same type of temperature compensation as loop 76.

Referring now to FIG. 2 there is shown a strain gauge arrangement 80 affixed to the top surface of cap 50 to detect the deflection of deformable wall 53. This arrangement comprises windings 82 and 86 whose resistance decreases with increases in pressure, and windings 84 and 88 whose resistance increases with increases in pressure. Solder tabs 83, 85, 87, 89, 91 and 93 are provided on the top surface of cap 50 so that the windings 82, 84, 86 and 88 can be connected externally as shown in FIG. 3. For example, temperature compensation wire 74 would be connected between tabs 83 and 91. An input excitation voltage would be connected across tabs 85 and 89, and an output voltage would be sensed across tabs 91 and 93.

FIG. 3 clearly illustrates the connections of the resistive windings of the strain gauge arrangement 80 shown in FIG. 2. The resistors 82A, 84A, 86A and 88A schematically represent the windings 82, 84, 86 and 88, respectively. The resistors 90A and 92A schematically represent the resistance of the wire lengths 90 and 92 respectively of wire 74. Resistor 76A is the temperature compensation resistance and schematically depicts the wire loop 76 shown in FIG. 1.

An input signal would be applied across terminals 95, 97 and a pressure responsive voltage would be measured across terminals 96, 98. As previously mentioned, the temperature compensation arm including resistors 90A, 92A and 76A is connected in series with resistance 82A, whose resistance decreases with increased pressure. This arrangement tends to maintain the strain gauge bridge in balance and independent of temperature changes. The temperature compensation arm could also be connected in series with resistance 86A, or alternatively separate temperature compensation arms could be tied in series with resistors 82A and 86A, respectively.

According to the present invention, cap 50 is preferably welded to upper portion 22. A weld joint is made between annular recesses 56 and 57 in cap 50 and portion 22, respectively. When one desires to change pressure ranges the cap 50 can be easily removed by machining or cutting and a cap having a different thickness of wall 53 substituted therefore and rewelded.

Another feature of the present invention is concerned with high pressure ranges. Screw threads 26 are provided on the outer surface of upper portion 22 so that a clamping device (not shown) can be threaded thereon. This clamping device would be somewhat U-shaped and would hold tightly against the outer portion of the top surface of cap 50. This clamping device would further aid in holding cap 50 in place under high pressures.

In still another embodiment of the invention a flexible coupler may comprise part of intermediate portion 34, preferably at its bottom end. Such a coupler is indicated at 46 in FIG. 1 of the above-cited Pastan patent. Obviously such a coupler would have to be placed above portion 60 and not between portion 60 and the screw threads 70 of stem portion 22.

From the foregoing description those skilled in the art will appreciate that numerous modifications may be made of this invention without departing from its spirit. Therefore, it is not intended to limit the breadth of this invention to the embodiments illustrated and described. Rather, it is intended that the breadth of this invention be determined by the appended claims.

What is claimed is:

1. A pressure transducer comprising,
   an elongated frame having means defining a passage, a flat surface at one end thereof, and mating means adjacent the flat surface,
   a capillary tube extending through the frame and terminating at one end adjacent another end of the frame,
   a coupler closing the other end of the frame and defining with the frame a chamber in communication with the capillary tube, a liquid filled deformable sensor including a cap member having a recess therein and mating means adjacent thereto for connecting with the mating means of the frame, said recess and flat surface defining a thin disc-shaped compartment in communication with another end of the capillary tube, and a liquid filling the capillary tube, chamber and compartment for applying the pressure exerted against the coupler to the sensor.

2. A pressure transducer according to claim 1 further characterized by said cap member defining a thin deflectable wall defining said recess and one side of said compartment, and said frame includes an upward extending portion defining the flat surface and another side of said compartment.

3. A pressure transducer according to claim 1 further comprising strain gage windings bonded to an outer surface of said deflectable wall to measure the pressure applied to the wall by the liquid.

4. A pressure transducer according to claim 3 wherein four active strain gauge windings are arranged in a bridge network.

5. A pressure transducer according to claim 1 further comprising a temperature compensating element positioned adjacent said coupler and adapted to be coupled to said sensor.

6. A pressure transducer according to claim 5 wherein said sensor comprises a strain gauge bonded thereto including four active strain gauge windings arranged in a bridge network with said temperature compensating element coupled to at least one of said windings.

7. A pressure transducer according to claim 6 wherein said temperature compensating element includes a winding coiled about the capillary tube adjacent the coupler.

8. A pressure transducer according to claim 6 wherein said temperature compensating element includes a winding coupled in series with a winding of said strain gauge whose resistance decreases with increased pressure.

9. A pressure transducer according to claim 1 wherein said coupler comprises a soft flexible diaphragm.

10. A pressure transducer according to claim 1 wherein said liquid is mercury.

11. A pressure transducer comprising;
a housing,
a capillary tube extending through the housing and terminating at one end adjacent one end of the housing,
a coupler closing the one end of the housing and defining with the housing a chamber in communication with the capillary tube,
said housing having means defining a sensor compartment near another end of the housing and in communication with another end of the capillary tube,
a liquid filling the capillary tube, chamber and compartment for applying the pressure exerted against the coupler to the means defining a sensor compartment,
a temperature compensating element positioned adjacent said chamber,
and means coupling said element to said means defining a sensor compartment,
said element compensating for temperature changes in the vicinity of said coupler to alter pressures measured at said means defining a sensor compartment,
wherein said temperature compensating element includes a winding of a plurality of turns coiled adjacent the coupler chamber.

12. A pressure transducer as set forth in claim 11 wherein said means defining a sensor compartment comprises a strain gauge arrangement including four strain gauge windings arranged in a bridge network with said temperature compensating element coupled to at least one of said windings.

13. A pressure transducer as set forth in claim 12 wherein said winding of said temperature compensating element is coupled in series with a winding of said strain gauge whose resistance decreases with increased pressure.

14. A pressure transducer comprising;
a housing,
a capillary tube extending through the housing and terminating at one end adjacent one end of the housing,
a coupler closing the one end of the housing and defining with the housing a chamber in communication with the capillary tube,
said housing having means defining a sensor compartment near another end of the housing and in communication with another end of the capillary tube,
a liquid filling the capillary tube, chamber and compartment for applying pressure exerted against the coupler to the means defining a sensor compartment,
a temperature compensating length of wire disposed adjacent the one end of the capillary tube and the chamber,
and wire means coupling said length of wire to said means defining a sensor compartment,
said length of wire compensating for temperature changes in the vicinity of said coupler to alter pressures measured at said means defining a sensor compartment.

15. A pressure transducer as set forth in claim 14 further comprising a strain gauge arrangement including a plurality of strain gauge windings with said length of wire coupled to at least one of said windings.

16. A pressure transducer as set forth in claim 15 wherein said length of wire couples in series with a winding of said strain gauge arrangement whose resistance decreases with increased pressure.

17. A pressure transducer as set forth in claim 14 wherein said length of wire is coiled about the one end of the capillary tube.

18. A pressure transducer as set forth in claim 14 wherein said length of wire has a difference per unit length resistance than the resistance of said wire means.

* * * * *